July 22, 1924.
W. B. WESCOTT
LENS SYSTEM
Original Filed Sept. 11, 1916    2 Sheets-Sheet 2
1,502,078
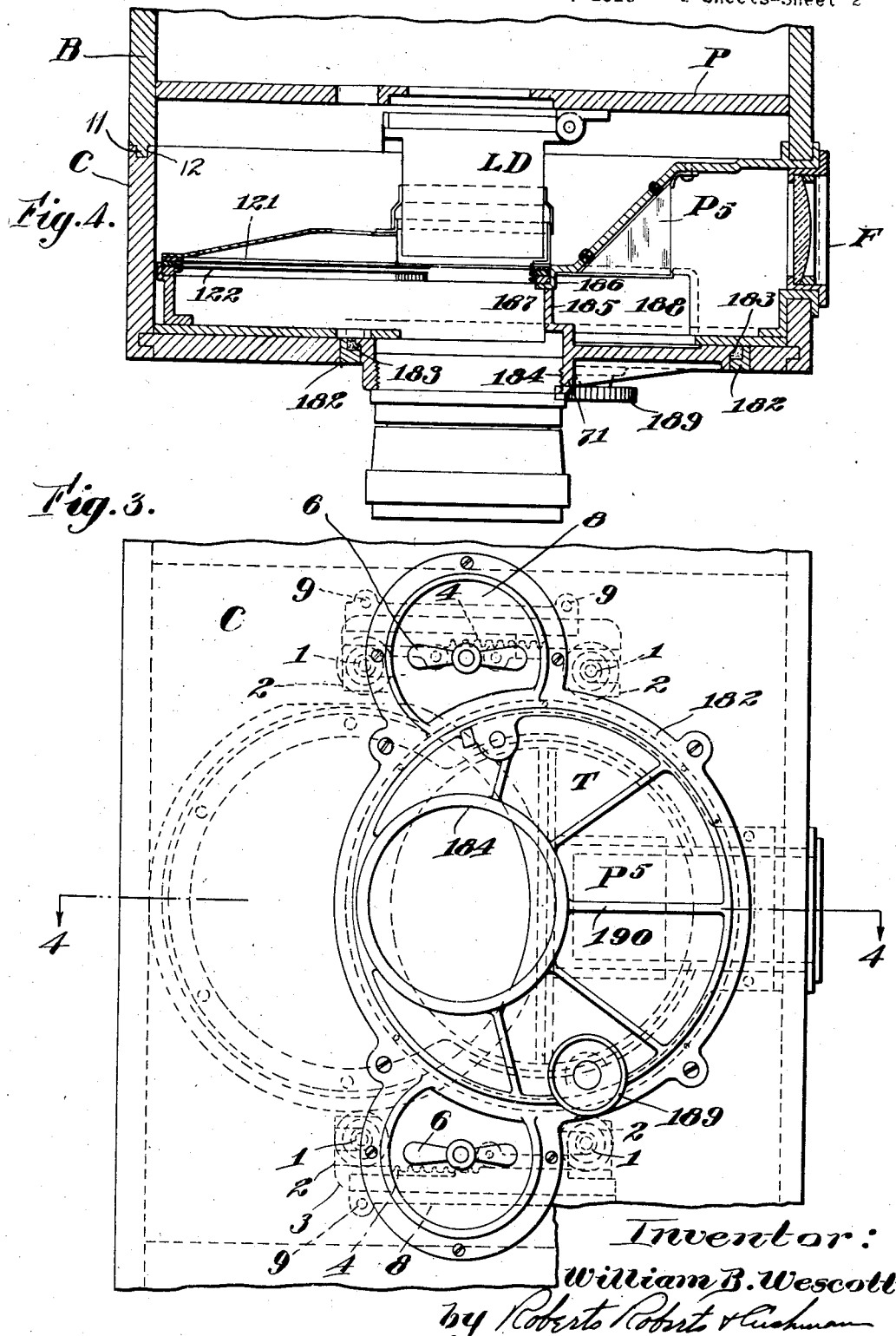

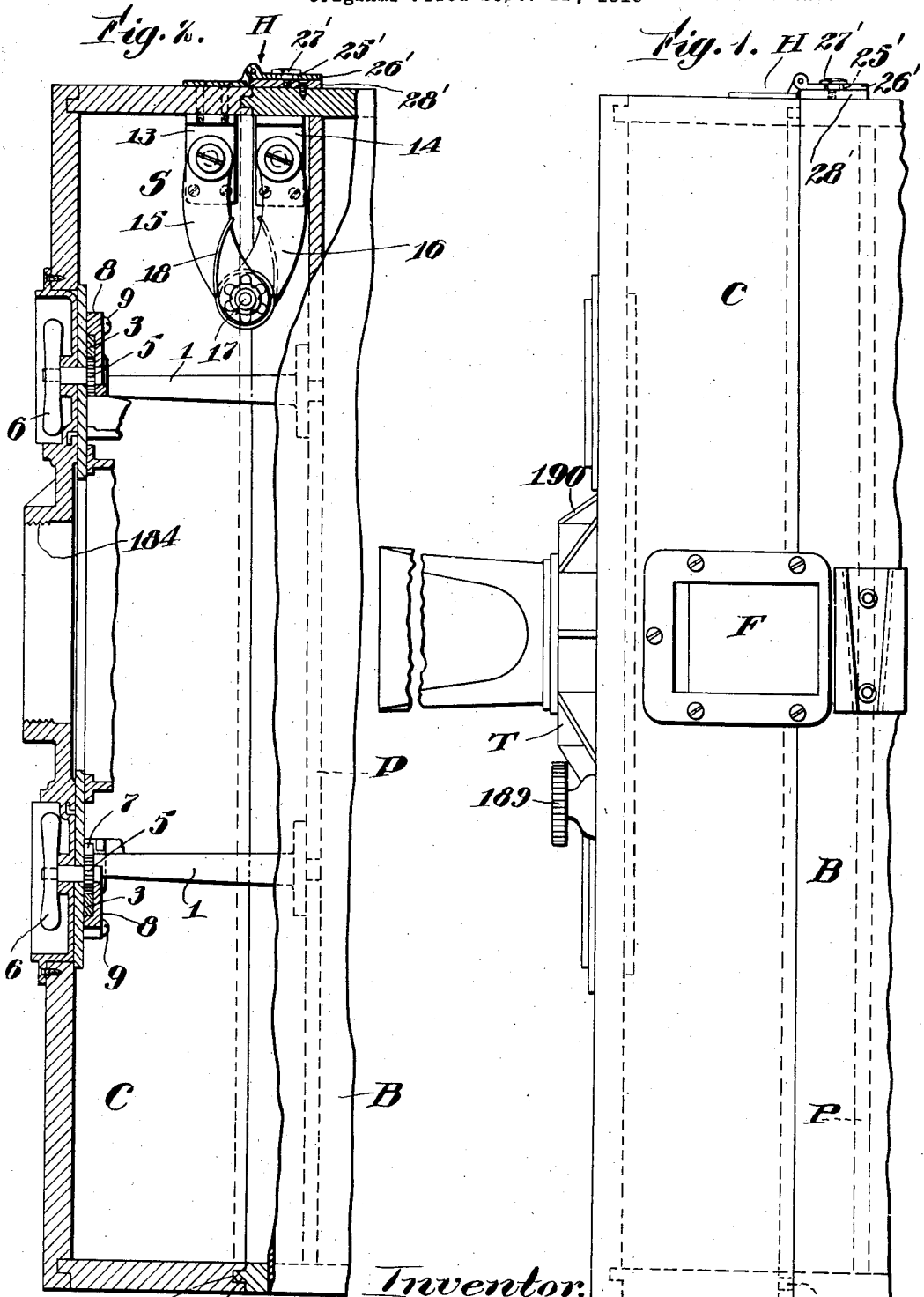

Patented July 22, 1924.

1,502,078

UNITED STATES PATENT OFFICE.

WILLIAM BURTON WESCOTT, OF WELLESLEY, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

LENS SYSTEM.

Original application filed September 11, 1916, Serial No. 119,377. Divided and this application filed April 25, 1921. Serial No. 464,206.

*To all whom it may concern:*

Be it known that I, WILLIAM B. WESCOTT, citizen of the United States of America, and resident of Wellesley, in the county of Norfolk and State of Massachusetts, have invented new and useful Improvements in Lens Systems, of which the following is a specification.

This invention relates to photographic cameras and more particularly to motion picture cameras, this being a division of my prior application Serial No. 119,377, filed September 11, 1916, which matured into Patent No. 1,383,357 on July 5, 1921.

The object of the invention is to provide an improved optical arrangement for cameras and the like and more particularly to provide means whereby the same lens may be readily shifted into either of two optical paths.

Other objects attained by my invention will be apparent from the following description and the accompanying drawings, in which—

Figure 1 is a side elevation of the forward portion of a camera embodying the present invention;

Fig. 2 is a vertical central section of the same, parts being omitted;

Fig. 3 is a front elevation of the same, interior parts being shown by dotted lines; and Fig. 4 is a horizontal section taken on line 4—4 of Fig. 3.

For the purpose of illustration I have shown the invention applied to a motion picture camera comprising a box B of ordinary construction having a cover C pivoted to the top of the box to swing upwardly. The box is divided into two compartments by the partition P, which carries most of the camera mechanism on its front and rear sides. Members 1 are secured to the front of the partition and cooperate with slotted bayonet catches 2 mounted on the inside of the cover. The upper and lower pairs of bayonet members 2, respectively, are connected together by members 3 provided with teeth 4 forming a rack cooperating with the pinion 5 which is controlled by a handle 6 on the outside of the cover. The members 1 projecting from the front of the partition P are provided with heads 7 arranged to be engaged by the bayonet members 2 whereby the cover may be securely and accurately locked in position relative to the camera box, thus positioning the lenses carried by the cover in accurate alinement with the film gate openings. Members 8 secured to the cover by means of screws 9 are provided to form guides for the reciprocating rack members 3. The box B is provided with a tongue 11 extending around the front edge which cooperates with a groove 12 on the cover to form a light tight connection between the box and the cover.

As shown in Figs. 1 and 2, the hinge mechanism H for pivotally connecting the cover C with the box B comprises slots 25' in the hinge member 26' cooperating with screws 27' threaded into plate 28', which, in turn, is screwed to the box B. The screws 27' have shoulders contacting with plate 28' whereby the heads of the screws may be so positioned as to permit the hinge member 26' to slide freely thereunder. When the cover C is locked into position with relation to the box B by the locking means above described, the pin and slot connection permits the cover to move bodily to or from the box. Thus, inasmuch as the cover may be accurately positioned and rigidly maintained in position by the locking means alone, the hinges need not be made with a great degree of precision. Furthermore, when the box and cover are made of wood, shrinkage and expansion of these parts are likely to occur and the pin and slot connection provides for such contingency. Cushioning mechanism S, as shown in Fig. 2, may be provided to prevent the cover from being too quickly closed, as for example, from being violently closed by gravity. Suitable mechanism for this purpose comprises members 13 and 14 respectively secured to the cover and box and having pivoted thereto arms 15 and 16 which are pivoted together at 17, the pivotal connection 17 being surrounded by a coil spring 18 cooperating with the arms 15 and 16.

The shutter mechanism comprising shutters 121 and 122 and the parts for operating the same are described in detail in my copending application, Serial No. 464,205, filed on even date herewith. Since this mechanism forms no part of the present invention, description thereof is omitted.

According to the present invention means is provided for shifting a lens into either of two optical paths. Thus in the illustrated embodiment a single lens is employed at times as the main image forming means and at other times as an auxiliary image forming means for the finder mechanism. As shown in Figs. 3 and 4, the optical paths of the camera and the finder have respective parallel portions arranged adjacent to each other and at these adjacent portions I preferably mount the camera lens so that it can be rotated into alinement either with the light-dividing means LD comprising a part of the main optical path or with the totally deflecting prism $P_5$ comprising means to reflect light to the finder F. Suitable means for changing the position of the lens comprises a turret T rotatably mounted in bearing 182 having light-tight packing 183. The turret has a threaded opening 184 to receive the lens and a partition 185 on the rear central portion thereof cooperating with a member 186 to prevent light from passing between the main chamber 187 and the auxiliary chamber 188 when the turret is in either operative position, the partition 185 occupying substantially the position shown in the drawings when the lens is in alinement with either of the optical paths. A thumb screw 189 may be provided to lock the turret in either of its operative positions, and ribs 190 are preferably provided on the outer face of the turret to add rigidity thereto.

I claim:

1. Photographic apparatus comprising a light-tight casing having a plurality of optical paths therewithin, said paths having respectively parallel portions adjacent each other and in line with an opening in the casing, a rotatable member mounted in said opening in light-tight engagement with said casing, and a lens mounted on said member and movable on rotation of the latter into alignment with each of said optical paths.

2. Photographic apparatus comprising a light-tight casing having a circular opening in the front thereof, said casing having a plurality of optical paths therewithin having parallel portions in line with said opening, a bearing on said casing surrounding said opening, a turret rotatably mounted in said bearing and making light-tight engagement therewith, a lens mounted on said turret and movable therewith into alignment with each of said paths, and means for locking the turret in adjusted position.

3. Photographic apparatus comprising a light-tight casing having two optical paths therewithin, portions of which extend in parallelism into a chamber, said casing having an opening before said chamber, a turret rotatably mounted in said opening in light-tight engagement with the casing, a lens on said turret movable therewith into alignment with either path, and a partition member on said turret extending into said chamber to prevent light admitted by the lens to one path from reaching the other.

4. Motion picture apparatus comprising a casing supporting a part of the optical system, a cover for said casing supporting a part of the optical system, means for rigidly positioning said cover relative to said casing with the said parts of said optical system in accurate alinement, and means for connecting said cover to said casing whereby said cover may be both turned and reciprocated relative to said casing.

Signed by me at Boston, Massachusetts, this 18th day of April, 1921.

WILLIAM BURTON WESCOTT.